O. E. COWLES.
DEVICE FOR LOCATING PLACES ON MAPS.
APPLICATION FILED JULY 3, 1912.
1,110,901. Patented Sept. 15, 1914.
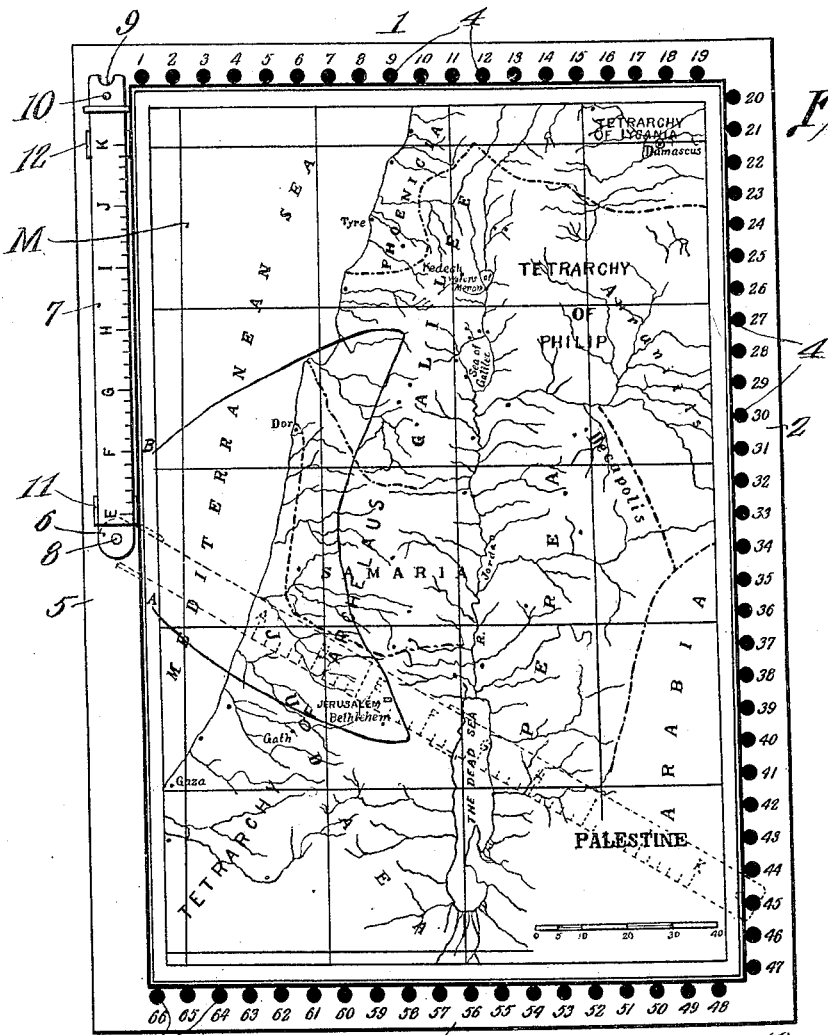
Fig. 1.
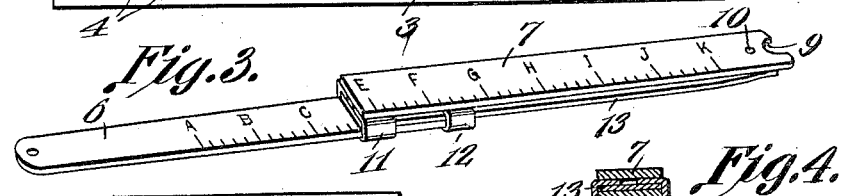
Fig. 3. Fig. 4. Fig. 2.
Witnesses:
O. E. Cowles, Inventor,
by C. A. Snow & Co.
Attorneys.

UNITED STATES PATENT OFFICE.

ORA E. COWLES, OF BARTON, VERMONT.

DEVICE FOR LOCATING PLACES ON MAPS.

1,110,901.

Specification of Letters Patent. Patented Sept. 15, 1914.

Application filed July 3, 1912. Serial No. 707,621.

*To all whom it may concern:*

Be it known that I, ORA E. COWLES, a citizen of the United States, residing at Barton, in the county of Orleans and State of Vermont, have invented a new and useful Device for Locating Places on Maps, of which the following is a specification.

The object of the invention is in a ready, simple, thoroughly feasible and practical manner and with accuracy and rapidity to locate any desired point on a map.

With the above and other objects in view, as will appear as the nature of the invention is better understood, the same consists, generally stated, in a map provided on three of its margins with suitably indicated divisions, in combination with a graduated telescopic arm pivotally connected with the unindicated margin and having appropriately designated graduations to co-act with the marginal divisions to locate places on the map, the free terminal of the arm being furnished with an index which may be in the form of a notch to be brought into register with any one of the divisions to cause the proper graduation on the arm to fix the desired location on the map.

The invention consists further in the various novel details of construction of a map and location indicator combined therewith, as will be hereinafter fully described and claimed.

In the accompanying drawings forming a part of this specification, and in which like characters of reference indicate corresponding parts;—Figure 1 is a view in plan of a map showing the same equipped with a location indicator embodying the characteristics necessary to secure the result designed. Fig. 2 is a fragmentary detail view of a portion of a table bearing the names of the places on the map, and also certain indicating symbols by which, in conjunction with the marginal indicating divisions on the map and the graduating arm, to locate places on the map. Fig. 3 is a perspective detail view of the telescopic graduated indicator arm. Fig. 4 is a transverse sectional view through the arm.

Referring to the drawing, M designates a map in this instance of ancient Palestine, it being understood that the invention is equally adapted to any kind of map whether mundane or terrestrial. Three margins of the map 1, 2 and 3 are provided with divisions indicated by numerals, in the present instance extending from 1 to 66, the notation beginning at the upper left hand corner of the map. The indicators 4 defining the divisions are in this instance shown as circles which may be open as exhibited, or solid as may be preferred, and are equally spaced, as clearly shown.

The fourth margin 5 of the map has pivotally connected with it, at a point central of its ends, a graduated arm comprising two members, 6 and 7, the former of which is connected by a pivot 8 with the map, and the latter of which is provided at its free end with an index which may be a notch 9 and adjacent thereto with a depression 10. The two sections of the arm may be connected for telescopic movements in any preferred manner the result in the present instance being accomplished by providing two keepers 11 and 12, the former of which is located at the inner end of the member 7 and passed around the member 6, the free ends of the keeper being secured between the arm member 7 and a spacer 13 which is substantially co-extensive in length with the member 7. The other keeper 12 is secured to the outer end of the member 6 and receives the spacer 13 for sliding movement. This manner of assembling the two members of the arm has been found thoroughly effective in practice, but it is to be understood that any other feasible means may be used for accomplishing the same purpose that may be found practicable and of advantage. The members of the keeper may be constructed of any suitable material such as celluloid, or like material, and the member 6 is graduated, in this instance, into five divisions divided into five equal parts, the five divisions being designated by the letters A, B, C and D. The member 7 is similarly graduated, the divisions being indicated by the letters E, F, G, H, I, J, K. On any appropriate part of the map, either on its face or on its back, as may be preferred, is arranged a table 14 on which is printed the names of the different places on the maps, and opposite each name the two indicators corresponding to those on the marginal map and on the arm. Instead of printing the table on the map, it may be printed on a separate sheet to accompany the same.

As an example of the manner in which the map is used, let it be supposed that it is desired to locate Bethlehem. Upon referring to the table it will be found opposite the name Bethlehem the legends 45 and $E^2$. This indicates that the arm shall be swung until the index or notch 9 registers with the division on the margin of the map indicated by 45, and by casting the eye along the scale on the member 7 until $E^2$ is reached, it will be found that Bethlehem appears opposite the latter indication. To facilitate the finding of the places, a pencil or other pointed instrument may be inserted in the depression 10 in order to manipulate the arm.

Now if all of the places of interest upon the map could be grouped in a plurality of sets, each set comprising a number of places located on a circle the center of which is the pivot 8, then a rigid, one-piece arm would be thoroughly efficient and it would be necessary merely to inscribe the arm with a few characters, each character representing one circular set of places to be found. As a matter of fact, of course, the places of interest are located in no such regular order, but, lie promiscuously and haphazard upon the face of the map, and perhaps no two places will be upon the same circle. There must, therefore, upon a rigid arm, be as many graduations of characters as there are circles in which places are located, and since each circle may pass through one place only, the graduations must be increased in number, and when the graduations are increased in number, each graduation is rendered correspondingly hard to locate, and if much time is consumed in the finding of a particular graduation on the arm, the time could as profitably be employed in looking for a given place on the map directly and without the use of the arm, the object of the structure being to economize time.

When the member 7 is slid inwardly and when the notch 9 is brought successively adjacent the indicators 4, any one graduation on the member 7, say the graduation $E^2$ which locates Bethlehem, travels in an irregular path shown on the map by the line A—B and due to the form of the line A—B it is obvious that a great number of places upon the map may be located by aid of this single graduation $E^2$. But few graduations, therefore, are necessary and each graduation on the member 7 is correspondingly easy to find.

In practice, it will be found that the arrangement disclosed will be thoroughly effective for the purpose designed, and will enable anyone in a very short time to be able to locate any point on any map in use.

What I claim is—

A map having characters along its margin, and an arm pivoted to the map; the arm having an index at its free end and the arm being provided with graduations, the arm comprising slidably connected parts, permitting the index at the free end of the arm to be brought into coincidence with the respective characters thereby to position the arm properly, and permitting each graduation on one of the slidably connected parts to assume different positions longitudinally of the arm.

In testimony that I claim the foregoing as my own, I have hereto affixed my signature in the presence of two witnesses.

ORA E. COWLES.

Witnesses:
 WALLACE H. GILPIN,
 D. W. ALLEN.

Copies of this patent may be obtained for five cents each, by addressing the "Commissioner of Patents, Washington, D. C."